United States Patent
King et al.

(10) Patent No.: US 12,423,170 B2
(45) Date of Patent: Sep. 23, 2025

(54) SYSTEMS AND METHODS FOR GENERATING A SYSTEM LOG PARSER

(71) Applicant: Secureworks Corp., Wilmington, DE (US)

(72) Inventors: William Michael King, Saint Amant, LA (US); Raul Garcia Calvo, Edinburgh (GB)

(73) Assignee: Secureworks Corp., Dallas, TX (US)

( * ) Notice: Subject to any disclaimer, the term of this patent is extended or adjusted under 35 U.S.C. 154(b) by 422 days.

(21) Appl. No.: 17/578,692

(22) Filed: Jan. 19, 2022

(65) Prior Publication Data
US 2023/0229540 A1   Jul. 20, 2023

(51) Int. Cl.
| | |
|---|---|
| *G06F 11/07* | (2006.01) |
| *G06F 16/334* | (2025.01) |
| *G06F 16/35* | (2019.01) |
| *G06F 18/214* | (2023.01) |
| *G06N 7/01* | (2023.01) |

(52) U.S. Cl.
CPC ...... *G06F 11/0769* (2013.01); *G06F 11/0787* (2013.01); *G06F 16/3346* (2019.01); *G06F 16/35* (2019.01); *G06F 18/214* (2023.01); *G06N 7/01* (2023.01)

(58) Field of Classification Search
CPC ...... G06F 11/0769; G06F 16/35; G06F 16/38; G06F 16/3346; G06F 18/214
See application file for complete search history.

(56) References Cited

U.S. PATENT DOCUMENTS

| | | | |
|---|---|---|---|
| 6,115,686 | A | 9/2000 | Chung et al. |
| 7,606,801 | B2 | 10/2009 | Faitelson et al. |
| 7,653,633 | B2 | 1/2010 | Villella et al. |
| 7,856,411 | B2 | 12/2010 | Darr |
| 8,079,081 | B1 | 12/2011 | Lavrik et al. |
| 8,156,553 | B1 | 4/2012 | Church et al. |
| 8,578,393 | B1 | 11/2013 | Fisher |

(Continued)

FOREIGN PATENT DOCUMENTS

| | | |
|---|---|---|
| CN | 105005549 A | 10/2015 |
| WO | WO2021/067238 A1 | 4/2021 |

OTHER PUBLICATIONS

SECUREWORKS—Log Management—Protect your infrastructure from known and emerging threats; www.secureworks.com/resources/ds-log-management; 2015 (available).

(Continued)

*Primary Examiner* — Esther B. Henderson
(74) *Attorney, Agent, or Firm* — IP Spring (57) ABSTRACT

The present disclosure provides systems and methods for generation of parsing scripts or rules for unstructured or semi-structured system log messages, including systems and methods for identifying and clustering of same or substantially similar system log messages using machine learning. Patterns indicative of the same or substantially similar types system log messages can be generated based on the clustering of the system log messages and calculated similarities of attributes or distances between common features/fields of the system log messages, with the results of the clustering presented for analysis and development or adjustment of parsing scripts.

12 Claims, 7 Drawing Sheets

(56) References Cited

U.S. PATENT DOCUMENTS

| | | | |
|---|---|---|---|
| 8,595,170 | B2 | 11/2013 | Gladstone et al. |
| 8,621,618 | B1 | 12/2013 | Ramsey et al. |
| 8,701,176 | B2 | 4/2014 | Ramsey et al. |
| 8,832,048 | B2 | 9/2014 | Lim |
| 8,898,777 | B1 | 11/2014 | Oliver |
| 8,928,476 | B2 | 1/2015 | Jerhotova et al. |
| 9,122,694 | B1 | 9/2015 | Dukes |
| 9,338,134 | B2 | 5/2016 | Yin |
| 9,384,112 | B2 | 7/2016 | Petersen et al. |
| 9,411,672 | B1 | 8/2016 | Cooper et al. |
| 9,430,534 | B2 | 8/2016 | Bhattacharya et al. |
| 9,438,563 | B2 | 9/2016 | Yin |
| 9,483,583 | B2 | 11/2016 | Braun et al. |
| 9,560,062 | B2 | 1/2017 | Khatri et al. |
| 9,596,252 | B2 | 3/2017 | Coates et al. |
| 9,767,302 | B2 | 9/2017 | Lim |
| 10,594,713 | B2 | 3/2020 | McLean |
| 10,599,668 | B2 | 3/2020 | McLean |
| 10,764,315 | B1 | 9/2020 | Carroll |
| 10,785,238 | B2 | 9/2020 | McLean et al. |
| 10,977,271 | B2 | 4/2021 | McLean |
| 11,044,263 | B2 | 6/2021 | McLean et al. |
| 11,218,500 | B2 | 1/2022 | Soeder et al. |
| 2003/0217292 | A1 | 11/2003 | Steiger |
| 2004/0193912 | A1 | 9/2004 | Li |
| 2006/0253447 | A1 | 11/2006 | Judge |
| 2007/0226248 | A1 | 9/2007 | Darr |
| 2008/0262991 | A1 | 10/2008 | Kapoor |
| 2009/0307640 | A1 | 12/2009 | Chapman et al. |
| 2011/0153667 | A1 | 6/2011 | Parmenter |
| 2011/0185055 | A1 | 7/2011 | Nappier |
| 2012/0185275 | A1 | 7/2012 | Loghmani |
| 2012/0254333 | A1 | 10/2012 | Chandramouli |
| 2013/0227519 | A1 | 8/2013 | Maleport |
| 2013/0238319 | A1 | 9/2013 | Minegishi et al. |
| 2013/0318604 | A1 | 11/2013 | Coates et al. |
| 2014/0040261 | A1 | 2/2014 | Horne |
| 2014/0041028 | A1 | 2/2014 | Ramsey et al. |
| 2014/0047544 | A1 | 2/2014 | Jakobsson |
| 2014/0372105 | A1 | 12/2014 | Manadhata |
| 2015/0040225 | A1 | 2/2015 | Coates et al. |
| 2015/0067839 | A1 | 3/2015 | Wardman et al. |
| 2015/0135287 | A1 | 5/2015 | Medeiros et al. |
| 2015/0264011 | A1 | 9/2015 | Liang |
| 2015/0271047 | A1 | 9/2015 | McLean |
| 2015/0324457 | A1 | 11/2015 | McLean |
| 2016/0014151 | A1 | 1/2016 | Prakash |
| 2016/0182546 | A1 | 6/2016 | Coates et al. |
| 2016/0217522 | A1 | 7/2016 | Jnagal et al. |
| 2016/0342805 | A1 | 11/2016 | Lim |
| 2016/0371489 | A1 | 12/2016 | Puri et al. |
| 2017/0140295 | A1 | 5/2017 | Bandara |
| 2017/0142149 | A1 | 5/2017 | Coates et al. |
| 2017/0171228 | A1 | 6/2017 | McLean |
| 2017/0187734 | A1 | 6/2017 | Lee |
| 2017/0201548 | A1 | 7/2017 | Kinder et al. |
| 2017/0214701 | A1 | 7/2017 | Hasan |
| 2017/0220218 | A1 | 8/2017 | Zhao et al. |
| 2017/0220664 | A1 | 8/2017 | Rulev et al. |
| 2017/0223039 | A1 | 8/2017 | Mont |
| 2017/0243004 | A1 | 8/2017 | Kinder et al. |
| 2017/0244734 | A1 | 8/2017 | Kinder et al. |
| 2017/0244750 | A1 | 8/2017 | Kinder et al. |
| 2017/0244754 | A1 | 8/2017 | Kinder et al. |
| 2017/0244762 | A1 | 8/2017 | Kinder et al. |
| 2017/0359368 | A1 | 12/2017 | Hodgman et al. |
| 2018/0124073 | A1 | 5/2018 | Scherman et al. |
| 2018/0124085 | A1 | 5/2018 | Frayman et al. |
| 2018/0173812 | A1 | 6/2018 | Agarwal et al. |
| 2018/0183821 | A1 | 6/2018 | Schneider |
| 2019/0095801 | A1 | 3/2019 | Saillet et al. |
| 2019/0130009 | A1* | 5/2019 | McLean ................ G06F 40/205 |
| 2019/0379678 | A1 | 12/2019 | McLean et al. |
| 2020/0036750 | A1 | 1/2020 | Bahnsen |
| 2020/0336497 | A1 | 10/2020 | Seul et al. |
| 2021/0149754 | A1* | 5/2021 | Settle .................. G06F 11/0772 |
| 2021/0185057 | A1 | 6/2021 | McLean |
| 2021/0200740 | A1 | 7/2021 | Sterngold |
| 2022/0070182 | A1 | 3/2022 | Bowditch et al. |
| 2022/0191211 | A1* | 6/2022 | Laliberte ............... H04L 63/101 |
| 2022/0405160 | A1* | 12/2022 | Datar .................. G06F 11/3409 |
| 2023/0093666 | A1* | 3/2023 | Chan ..................... G06F 40/186 |
| | | | 726/26 |

OTHER PUBLICATIONS

Sofya Raskhodnikova & Adam Smith; CSE 598A Algorithmic Challenges in Data Privacy; Lecture 2; Jan. 19, 2010.

Liu, Y., Wang, Q., Zhuang, M. and Zhu, Y.; Reengineering Legacy Systems with RESTFul Web Service; 2008 32$^{nd}$ Annual IEEE International Computer Software and Applications Conference, 2008; pp. 785-790; doi: 10.1109/COMPSAC.2008.89; 2008.

GitHub; *A toolkit for making domain-specific probabilistic parsers*; https:/github.com/datamade/parserator; available Jan. 8, 2019.

WIKIPEDIA; Frequent pattern discovery; https://en.wikipedia.org/wiki/Frequent_pattern_discovery; last edited on Mar. 22, 2019.

WIKIPEDIA; *Grammar induction*: https://en.wikipedia.org/wiki/Grammar_induction; lasted edited on Jul. 23, 2019.

Ju, Meizhi; Miwa, Makoto and Ananiadou, Sophia; *A Neural Layered Model for Nested Named Entity Recognition*; Conference Proceedings of the 2018 Conference of the North American Chapter of the Association for Computational Linguistics: Human Language Technologies; vol. 1; pp. 1446-1459, New Orleans, Louisiana, Jun. 1-6, 2018; available at https://www.aclweb.org/anthology/N18-1131 and https://www.researchgate.net/publication/325447158_A_Neural_Layered_Model_for_Nested_Named_Entity_Recognition.

WIKIPEDIA; *Lexical analysis*: https://en.wikipedia.org/wiki/Lexical_analysis#Lexeme; last edited on Aug. 6, 2019.

WIKIPEDIA; *Active learning*; https://en.wikipedia.org/wiki/Active_learning; lasted edited on Jul. 2, 2019.

WIKIPEDIA; *Whitespace character*; https://en.wikipedia.org/wiki/Whitespace_character#Unicode; last edited on Aug. 13, 2019.

Ross, Stephane; Gordon, Geoffrey J; and Bagnell, J. Andrew; *A Reduction of Imitation Learning and Structured Prediction to No. Regret Online Learning*; 14$^{th}$ International Conference on Artificial Intelligence and Statistics (AISTATS 2011), Fort Lauderdale, FL, USA; vol. 15 of JMLR; (Cited as: arXiv:1011.0686v3 [cs.LG]); Mar. 16, 2011; available at https://arxiv.org/pdf/1011.0686.pdf.

GitHub; awesome-log-analysis; https://github.com/logpai/awesome-log-analysis/blob/master/papers.md#log-parsing; last updated Aug. 11, 2019.

Zhu, Jieming; He, Shilin; Liu, Jinyang; He, Pinjia; Xie, Qi; Zheng, Zibin and Lyn, Michael R.; *Tools and Benchmarks for Automated Log Parsing*; International Conference on Software Engineering (ICSE'19); (Cited as: arXiv:1811.03509v2 [cs.SE]); Jan. 3, 2019; available at https://arxiv.org/pdf/1811.03509.pdf.

Messaoudi, Salma; Panichella, Annibale; Bianculli, Domenico; Briand, Lionel and Sasnauskas, Raimondas; *A Search-based Approach for Accurate Identification of Log Message Formats*; Proceedings of the 26$^{th}$ IEEE/ACM International Conference on Program Comprehension (ICPC'18); Publisher ACM; pp. 167-177; May 27-28, 2018, Gothenburg, Sweden; available at http://publications.uni.lu/bitstream/10993/35286/1/ICPC-2018.pdf and http://orbilu.uni.lu/handle/10993/35286.

IEEE; He, Pinjia; Zhu, Jieming; He, Shilin; Li, Jian and Lyu, Michael R.; *Towards Automated Log Parsing for Large-Scale Log Data Analysis*; IEEE Transactions on Dependable and Secure Computing; vol. 15, Issue: 6; pp. 931-944; Oct. 13, 2017; available at https://ieeexplore.ieee.org/document/8067504 and https://pinjiahe.github.io/papers/TDSC17.pdf.

Hamooni, Hossein; Debnath, Bipolb; Xu, Jianwu; Zhang, Hui, Jiang, Guofei; and Mueen Abdullah; *LogMine: Fast Pattern Recognition for Log Analytics*; CIKM 2016; Oct. 24-28, 2016, Indianapolis, In USA; available at https://www.cs.unm.edu/~mueen/Papers/LogMine.pdf.

Du, Min and Li, Feifei; *Spell: Streaming Parsing of System Event Logs*; 2016 IEEE 16$^{th}$ International Conference on Data Mining (ICDM), Dec. 12-15, 2016, Barcelona, Spain; Publisher: IEEE;

(56) References Cited

OTHER PUBLICATIONS available at https://ieeexplore.ieee.org/document/7837916 and https://www.cs.utah.edu/~lifeifei/papers/spell.pdf.

He, Pinjia; Zhu, Jieming; Zheng, Zibin and Lyu, Michael R.; *Drain: An Online Log Parsing Approach with Fixed Depth Tree*; 2017 IEEE International Conference on Web Services (ICWS), Jun. 25-30, 2017, Honolulu, HI, USA; Publisher: IEEE; available at https://ieeexplore.ieee.org/document/8029742 and https://www.bing.com/search?q=drain%3A+An+Online+Log+Parsing+Approach+with+Fixed+Depth+Tree&src=IE-SearchBox&FORM=IESR3N.

He, Pinjia; Zhu, Jieming; He, Shilin; and Lyn, Michael R. *An Evaluation Study on Log Parsing and Its Use in Log Mining*; 2016 46th Annual IEEE/IFIP International Conference on Dependable Systems and Networks (DSN), Jun. 28-Jul. 1, 2016; Toulouse, France; Publisher: IEEE; available at https://ieeexplore.ieee.org/document/7579781 and https://pinjiahe.github.io/papers/DSN16.pdf.

Makanju, Adetokunbo, A. Nur Zincir-Heywood and Milios, Evangelos E.; *A Lightweight Algorithm for Message Type Extraction in System Application Logs*; IEEE Transactions on Knowledge and Data Engineering; vol. 24, Issue: 11; pp. 1921-1936; Publisher: IEEE; Jun. 30, 2011; available at https://ieeexplore.ieee.org/document/5936060 and https://web.cs.dal.ca/~makanju/publications/paper/tkde11.pdf.

Tang, Liang; Li, Tao and Perng, Chang-Shing; *LogSig: Generating System Events from Raw Textual Logs*; Conference Proceedings of the 20th ACM Conference on Information and Knowledge Management, CIKM 2011, Oct. 24-28, 2011; Glasgow, United Kingdom; available at http://users.cis.fiu.edu/~lpeng/log/2_LogSig-%20Generating%20system%20events%20from%20raw%20textual%20logs.pdf and https://www.researchgate.net/publication/221615397_LogSig_Generating_system_events_from_raw_textual_logs.

Makanju, Adetokunbo; A. Nur Zincir-Heywood and Milios, Evangelos; *Clustering Event Logs Using Iterative Partitioning*; Proceedings of the 15th ACM SIGKDD International Conference on Knowledge Discovery and Data Mining; pp. 1255-1264; Jun. 28-Jul. 1, 2009, Paris, France; available at https://web.cs.dal.ca/~makanju/publications/paper/kdd09.pdf and https://dl.acm.org/citation.cfm?id=1557154.

Fu, Qiang; Lou, Jian-Guang; Wang, Yi and Li, Jiang; *Execution Anomaly Detection in Distributed Systems through Unstructured Log Analysis*; Microsoft Research Asia, Beijing, P.R. China and Dept. of Computer Science & Technology, Beijing University of Posts and Telecommunications, Beijing, P.R. China; ICDM Conference 2009, The Ninth IEEE International Conference on Data Mining; Miami, Florida, USA; Dec. 6-9, 2009; available at https://www.researchgate.net/publication/220765301_Execution_Anomaly_Detection_in_Distributed Systems_through Unstructured_Log_Analysis.

Lin, Hao; Zhou, Jingyu; Yao, Bin; Guo, Minyi and Li, Jie; *Cowic: A Column-Wise Independent Compression for Log Stream Analysis*; 2015 15th IEEE/ACM International Symposium on Cluster, Cloud and Grid Computing, May 4-7, 2015; Shenzhen, China; available at https://ieeexplore.ieee.org/document/7152468.

Mell, Peter and Harang, Richard E.; *Lightweight Packing of Log Files for Improved Compression in Mobile Tactical Networks*; 2014 IEEE Military Communications Conference, Oct. 6-8, 2014; Baltimore, MD, USA; available at https://ieeexplore.ieee.org/document/6956758.

Christensen, Robert and Li, Feifei; *Adaptive Log Compression for Massive Log Data*; SIGMOD'13; (ACM978-1-4503-2037-May 13, 2006); Jun. 22-27, 2013; New York, New York, USA; available at https://www.cs.utah.edu/~lifeifei/papers/compresslog.pdf.

Racz, Balazs and Lukacs, Andras; *High Density Compression of Log Files*; Proceedings of the Data Compression Conference (DCC 2004); 1068-0314/04; Apr. 2004 IEEE; available at https://www.academia.edu/3143402/High_density_compression_of_log_files and https://www.researchgate.net/publication/4065440_High_density_compression_of_log_files.

\* cited by examiner

SYSTEMS AND METHODS FOR GENERATING A SYSTEM LOG PARSER

TECHNICAL FIELD

This disclosure relates generally to generation of parsing scripts or rules for unstructured or semi-structured system log messages, and more particularly, relates to systems and methods for clustering some or substantially similar type syslog messages using and generating patterns based on the clustering for development.

BACKGROUND

Parsing unstructured and semi-structured system log messages is typically a manual process. Additionally, different computing devices typically generate different system log messages. Each such computing device also may utilize different peripherals, with each peripheral generating different system logs. Generating a parsing script or rules for each computing device generally is a time-consuming process, since such a process generally must be done manually or, at best, as a partially automated process. While pattern recognition exists, typical algorithms need to utilize a substantial sample size of messages, which often will not work for a variety of similar yet slightly varying system log messages, which can result in generation of a variety of incorrect patterns and inaccurate parsing scripts or rules.

Accordingly, it can be seen that a need exists for systems and methods directed to generation of parsing scripts and/or rules for unstructured and/or semi-structured system log messages that addresses the foregoing and other related, and unrelated, problems/issues in the art.

SUMMARY

Briefly described, according to various aspects, the present disclosure is directed to systems and methods that generate parsing scripts and/or rules for unstructured and/or semi-structured system log messages of an incoming stream or input flow of such messages. The parsing scripts and/or rules, once generated, may be utilized to thereafter parse future new generated/incoming system log messages of the same or substantially the same type without substantial manual processing or review. The generation of parsing scripts and/or rules may occur upon reception of the system log messages at an event management center. The event management center may be local (e.g., stored in memory of the computing device where the system log messages are generated) or remote (e.g., stored in a separate computing device than the computing device generating the system logs). The event management center may receive a plurality of incoming system log messages from a network computing device or server, or directly from one or more user devices (e.g. phones, tablets, etc.) or other devices (e.g. automated or server controlled equipment/systems) generating the system log messages.

As the system log messages are received, the event management center may determine if one or more parsing scripts are available to parse the system log messages. If no current parsing scripts and/or rules are available or if the currently available parsing scripts and/or rules do not apply to one or more unstructured and/or semi-structured messages of the incoming system log messages (e.g., the system log messages are in an unrecognizable format, among other factors), then the event management center may submit the unrecognized system log messages to one or more clustering models. The one or more clustering models will be configured to look for two or more system log messages of a same or substantially same type (e.g. system log messages submitted through a firewall having substantially the same format/type, but with some variations/variable attributes between each message) to form clusters of such same or substantially the same system log messages. The one or more clustering models further may be configured to search for patterns within the system log messages, remove variable attributes from the system log messages, leaving common features or attributes or other commonalities, and thereafter determine that the system log messages having common attributes or features are of the substantially same type. If such system log messages having common attributes or features are determined to be of the substantially same type, then the one or more clustering models may create a cluster of two or more system log messages together as a recognized or identified same or substantially same type. From there, a regex pattern can be generated for later parsing or normalizing of these same/substantially the same messages received in the future.

In one aspect, the present disclosure provides a system for parsing or normalizing security log data including unstructured and/or semi-structured system log messages. The system may include an event management center, which can include a memory and one or more processors. The one or more processors may be configured to receive a plurality of system log messages from a plurality of monitored devices, the security log messages including a plurality of different types of system log messages from various sources. The one or more processors also may be configured to determine whether one or more parsing scripts or rules are available to parse or normalize at least some of the system log messages, and if one or more parsing scripts or rules are available to parse or normalize at least some of the system log messages, the one or more processors may be configured to apply the one or more parsing scripts or rules thereto. If the system log messages are in an unrecognized format or a parsing script or rule is not available to parse or normalize the system log messages, the one or more processors may be configured to submit the system log messages to at least one clustering model stored in the memory and/or accessible by the at least one processor. The at least one clustering model will be configured to form clusters of system log messages of a same or a substantially same type. The model may be further configured to search for patterns within at least two log messages of the same or substantially the same type, and identify system log messages having common patterns as same or substantially the same type messages; remove variable attributes, features or fields within identified system log messages, leaving common fields, features, attributes, or other commonalties; and generates or develops an estimation that two or more of the identified system log messages having such commonalities are of the same or substantially same type (e.g. in some embodiments, the model can be configured to make a binary true/false estimation or "best guess" estimation that two or more security log messages logs are of the same type, i.e. they belong in the same cluster, based on pre-configured parameters); and, if the determined estimation indicates the identified system log messages are of the same type, the model will group the identified system log messages within a cluster of same and/or substantially same type system log messages. In embodiments, the event management center is further configured to generate a regex pattern based upon the clustered system log messages that will match subsequent system log messages of the same or substantially the same identified/cluster type for parsing or normalizing.

In addition, in embodiments, there are many logs in the cluster, e.g. the number of system log messages within a developed cluster exceeds a selected or pre-determined number for generating a pattern, the model can be configured to select the closest logs, e.g. those closest within the cluster or within a selected distance, to use for pattern generation. The model further can be configured to rank the security log messages within a developed cluster according to an estimated level of confidence or likelihood that the security log messages within each cluster are of the same type (e.g. ranking the security log messages according to an estimated "best guess"), and, in embodiments, can strip out messages that do not meet such a likelihood or which are estimated to likely not be of the same type, from the cluster, with the remaining security log messages of the cluster thereafter being used for generation of the regex pattern for later development of parsing scripts or rules for such security log message types.

The system and/or event management center may be included as or as a part of a data center of an entity whose devices are generating such system log messages, a data center of a managed security service provider, or a server device (e.g., such as a network server). Further, the event management center may include instructions stored in memory. These instructions may be a downloadable package. In such examples, a user may install the package on the users computing device. In another embodiment, the event management center may connect, over a network, to a user's computing device. The user may enable or disable the event management center or instructions. Once parsing scripts and/or rules are generated for the user's computing device, the user or the event management center itself may disable the event management center or instructions, thus preventing further use of computing resources (e.g., bandwidth, power, etc.).

In an embodiment, the clustering model will be configured to identify patterns within at least two system log messages of a series of incoming system log messages and develop a vocabulary of most commonly used present attributes, features, fields, etc. The model clustering may be further configured to determining a distance between the identified system log messages based upon a number of common non-varying attributes present in the identified system log messages and can cluster the system log messages based upon a selected distance.

In an embodiment, the event management center may be configured to apply one or more training data sets to the model, the one or more training data sets including historically identified features, fields or attributes indicative of recognizable ones of the system log messages received by the event management center. The model may be further configured to group the system log messages into clusters based upon two or more parameters, including a selected number of system log messages, a size of a vocabulary of commonly used attributes, a selected attribute length, a maximum distance between system log messages to be included within the cluster, and a minimum number of system log messages per cluster.

In an embodiment, the event management center may be configured to generate and/or display a user interface to a user's computing device. The user interface may allow for a user to edit, confirm, and/or save a generated parsing script and/or rules or a Regex. Further, the user interface may be configured to display the cluster for any particular parsing script and/or rules or a Regex. The user interface may also be configured to display removed variable attributes, as well as allow the user to remove and/or add other attributes to such a list indicating removal of such attributes (e.g. variable attributes) from messages.

In one aspect, the present disclosure provides a method of generating parsing scripts or rules for security log data. The method may include receiving security log data comprising a series of unstructured or semi-structured system log messages from a plurality of monitored devices. The method may include applying a probabilistic model to identify at least 2 system log messages having a pattern of common attributes indicating the at least 2 system log messages are of a same or substantially same type. The method also may include examining the logs of each cluster and removing logs based upon a selected or threshold level of confidence of that they do not match or are and the same or substantially same type of other system log messages with a defined cluster. The method may include clustering the identified system log messages into clusters of the same or substantially same type.

In another embodiment, the method further may include generating one or more regex pattern scripts configured to match an identified type of system log messages. The method also may include generating training data sets for training the probabilistic models. The method may further include updating the training data sets with security log data processed by the one or more engines. The method may include applying historical patterns to the system log messages.

In another embodiment, the method may include determining whether one or more parsing scripts or rules are available for parsing and/or normalization of the system log messages. The method may include, if one or more parsing scripts or rules are available to parse or normalize the unstructured security data, applying at least one selected parsing script or rule to the unstructured security data for parsing or normalization of the unstructured security data into a normalized log.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As shown in FIGS. 1-6, the present disclosure includes systems and methods for parsing or normalizing unrecognized, unstructured and/or semi-structured system logs or data (hereafter "syslogs"), including enabling non-developer skilled users to create parsing scripts/parsers or rules for new and/or varying syslog telemetry's. The present system and method enables an "intelligent best guess" to be created and generally automatically applied to such incoming unrecognized, unstructured and/or semi-structured syslogs via a two-step process of unsupervised machine learning model and a subsequent pattern generator. In addition, the operation of the unsupervised machine learning model or another algorithm, instructions, or software may include generating a regex pattern for such unrecognized, unstructured and/or semi-structured syslogs received in the future to enable ease and/or automated creation of a parsing script and/or rules for therefor. For example, a clustering model, and in some examples in addition to a pattern generator or other similar algorithm, on a local computing device or on a remote device can be utilized to automatically generate the parsing script and/or rules based on the results of the clustering model (e.g., the results being one or more clusters). The clustering model can determine whether patterns exist between messages in the syslogs and, based on the patterns, generate a regex for identified patterns thereof. The systems and methods may display or present each regex for confirmation/approval and further editing. Each regex can be saved and utilized to form the parsing script and/or rules.

The term "computing device" or "system device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "non-transitory machine-readable storage medium" is used to refer to any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

The term "processor" or "processing circuitry" is used to refer to any one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

Figure 1:
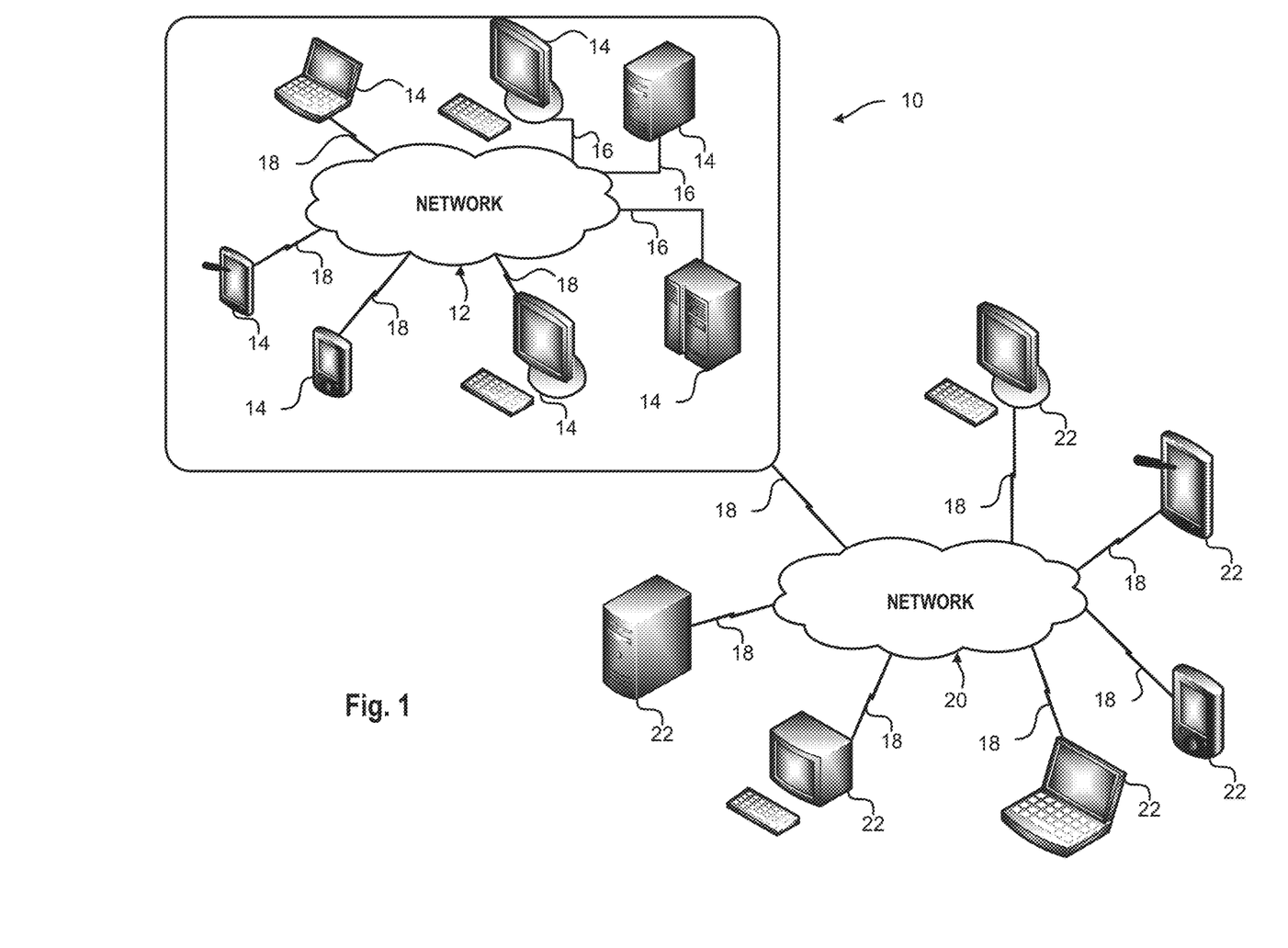
FIG. 1 is a schematic diagram of a data center including a networked system of information handling systems, according to one aspect of the present disclosure.

FIG. 1 is a block diagram of an exemplary data center 10 that can receive security data or other data such as a plurality or series of syslogs (e.g. as a feed or string of activity logs or data from a variety of devices, including, but not limited to computing devices, cellular phones and/or tablets, network systems, automated equipment or control systems, etc.), and logs may be parsed and/or parsing scripts and/or rules may be generated by an event management center. As shown in FIG. 1, the data center 10 can include a network 12 that may provide communications among a plurality of information handling systems 14, which can include work stations, personal computers, smart cellular telephones, personal digital assistants, laptop computers, servers, computing devices, other suitable devices, and/or combinations thereof. The information handling systems 14 further can be coupled to the network 12 through wired line connections 16, wireless connections 18, or any other suitable lines of communication or connection.

As further shown in FIG. 1, the data center 10, and/or one or more of the information handling systems 14 thereof, can be communicatively coupled to a network, including a cloud based or other network as shown at 12 or 20 in FIG. 1, for example, through wired line connection 16, or through any other suitable connection, such as a wireless connection 18 (e.g., Wi-Fi, cellular, etc.). The network 12 further can be accessible to/by one or more user or client managed information handling systems or devices 22 to facilitate communication between the client managed information handling systems 22 and the data center 10 for which syslog may be parsed and/or parsing scripts and/or rules may be generated by an event management center. The network 12 can include an API interface of the event management center, though the network can include any suitable network, such as the Internet or other wide area network, a local area network, or a combination of networks, and may provide communications, e.g., data communications, among the event management center and the client managed information handling systems 22.

The client managed information handling systems 22 can be connected to the network 20 through wired connections, e.g., an Ethernet cable, or other suitable wired or wireless connections 18, e.g., Wi-Fi, Bluetooth®, cellular connections (e.g., 3G, 4G, LTE, 5G, etc.), other suitable wireless connections or combinations thereof (FIG. 1), to enable the clients or operators of information handling systems 22 to communicate with the event management center, e.g., to access one or more services provided thereby. For example, the event management center can be or include a web service.

For purposes of the present disclosure, the information handling systems 14/22 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling systems also may include one or more buses operable to transmit communications between the various hardware components.

Figure 2:
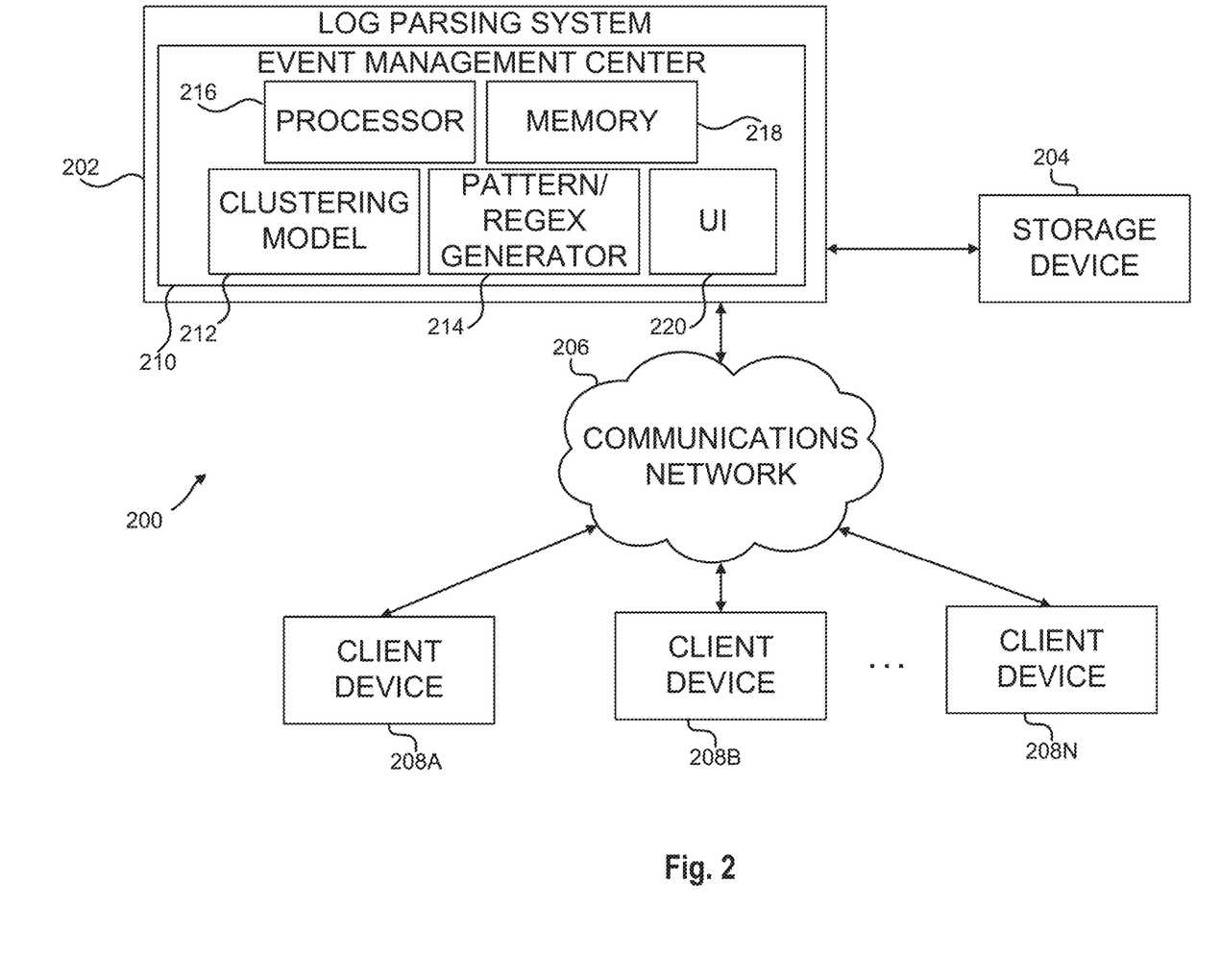
FIG. 2 is a schematic diagram of a system for parsing logs and generating parsing scripts or rules, according to one aspect of the present disclosure.

FIG. 2 is a schematic diagram of a system for parsing logs and generating parsing scripts or rules, according to one aspect of the present disclosure. A log parsing system 202 can be configured to parse syslogs and/or security event logs of information handling systems and, according to aspects of the present disclosure, generate parsing scripts and/or rules for parsing the syslogs and/or security event logs. For example, the system 200 of FIG. 2 may be implemented in or by the information handling system 10 (e.g. in hardware or memory) of FIG. 1. In one embodiment, the system 200, as illustrated in FIG. 2A, includes a system device (e.g., the log parsing system 202), a storage device 204, a communications network 206, and client devices 208A, 208B, up to 208N. The log parsing system 202 may further be connected to a number of private and/or public databases, repositories, or other data sources.

The log parsing system 202 may read, scan, or receive, when enabled, configured, or upon receiving a prompt or indicator, syslogs for each of the client devices 208A, 208B, up to 208N, and other data sources for parsing purposes and/or for generating a parsing script and/or rules. The log parsing system 202 may include various modules, engines, or circuitry, such as an event management center 210. The log parsing system 202 may include other modules, engines, or circuitry, such as an input/output module and/or sub-modules included in the event management center 210. Each module may include corresponding instructions and may comprise hardware (e.g., one or more processors 216 and memory 218 and/or other circuitry) or a portion of hardware in the log parsing system 202. In another embodiment, the modules or circuitry may include, rather than physical components, specific instructions stored in memory of the log parsing system 202 and/or in the storage device 204.

As noted, the event management center 210 may include and/or access various modules and/or hardware or portions of hardware. For example, the event management center 210 may include or may access a processor 216 and a memory 218. The memory 218 may include instructions executable by the processor 216. The event management center 210 may further include instructions or modules configured to perform functions when executed. For example, the event management center 210 may include a module related to and/or including a clustering model 212. Such a module may include instructions to receive or obtain syslogs from one or more of a client device 208A-208N. In an example, the log parsing system 202 may be included or installed on the client device 208A-208N. In such examples, the log parsing system 202 may utilize hardware resources on the respective client device 208A-208N. In such examples, the module including the clustering model 212 may scan selected locations (e.g., known locations, specified or selected locations, etc.) for new or existing syslogs. In other examples, a user may upload or transmit syslogs directly to the event management center 210.

Upon reception of a syslog or syslogs, event management center 210 may determine whether a parsing script and/or rules exist for the messages included in the syslog. In an embodiment, such a parsing script and/or rules that apply to all the messages or a portion of the messages in the syslogs may be found, in which case, the messages can be parsed or normalized using such existing parsing scripts or rules. In another embodiment, parsing scripts and/or rules may not apply or may not be available for a particular syslog or set of syslogs. If no parsing script and/or rules are available, the event management center 210 may apply or submit the syslogs to the clustering model 212. Prior to or after application submission to the clustering model 212, the event management center 210 or the clustering model 212 itself may remove variable attributes in each message. The variable attributes may include known values or statements that may not aid in identifying patterns or generating clusters. Such variable attributes may include, but are not limited to, dates in a plurality of formats, time or timestamps, IP addresses, usernames, and/or any known variable attribute. In such examples, the variable attribute may be replaced by a token or placeholder text (e.g., [date] for a date, [IP address] for an IP address, etc.) or may be removed. In an embodiment, another model may be utilized to determine variable attributes (e.g., by analyzing two or more similar messages and determining whether a variable attribute is significant), a user may provide variable attributes to the event management center 210, the event management center 210 may obtain variable attributes from memory 218 or the storage device 204, and/or another algorithm or program may be utilized to determine known variable attributes.

The clustering model 212 may search for or determine patterns present within the syslog. The clustering model 212 may then cluster similar messages. In an embodiment, rather than utilizing every message within a cluster, the clustering model 212 may utilize the messages within a particular "distance" of each other within the cluster. In other examples, the clustering model 212 may determine which messages are similar based on the distance. For example, the clustering model 212 may consider the different characters, words, and length of words within a message. Further, the clustering model 212 may generate a vector for each message based on a count of characters, words, and length of words within a message. Based on differences between the characters and difference between the words or the distance between two vectors (e.g., a Euclidian distance), the clustering model 212 may determine a total distance between two messages. The clustering model 212 may make such determinations for each pair of messages within a cluster. Based on a pre-determined or pre-selected threshold or distance and/or a pre-determined or pre-selected error, the clustering model 212 may use at least two messages within the threshold or distance based on the error. Further, the clustering model 212 may remove messages within the pre-determined or pre-selected threshold or distance (e.g., in a cluster) based on a pre-selected maximum number of messages in a cluster. Such a maximum number may include 10 or less messages.

In another embodiment, the clustering model 212 may, to form such clusters noted above, the clustering model can be configured to make a "best guess" estimation that two or more security log messages logs are of the same type, i.e. that two or more identified syslogs belong in the same cluster, based on pre-configured parameters. For example, the clustering model can be configured to make a binary, true/false or yes/no choice or determination that the two or more syslogs are of the same type and therefore belong in the same cluster. Upon identification of two or more syslogs that are estimated to be of the same type (e.g. based upon the estimated best guess/likelihood), the clustering model thereafter will group such identified syslogs within a cluster of same and/or substantially same type syslogs. Based on each cluster, the clustering model 212 may generate a Regex pattern for use in generating ones or more parsing scripts, parsing rules, or some combination thereof.

In embodiments, if the number of identified syslogs placed within a developed cluster exceeds a selected or pre-determined number for generating a pattern, the clustering model can select the closest logs, e.g. those closest within the cluster or within a selected distance, to use for pattern generation. The model further can be configured to rank the security log messages within a developed cluster according to an estimated likelihood that the security log messages within each cluster are of the same type (e.g. ranking the security log messages according to an estimated "best guess" or likelihood that they are or the same or substantially the same type based on selected parameters including a calculated distance between syslog messages within the cluster). In embodiments, messages that do not meet such a likelihood such that there is a lower level of confidence that such syslogs are of the same type (e.g. the clustering model cannot provide a best guess or binary true/false determination with a selected level of confidence that such syslogs are of the same or substantially the same type) these syslogs can be stripped or removed from the cluster, with the remaining syslogs of the cluster thereafter being used for generation of the regex pattern for later development of parsing scripts or rules for such security log message types The clustering model 212, as noted, may be an unsupervised machine learning based model or a probabilistic model. Particularly, the clustering model 212 may be based on an unsupervised learning model. In such embodiments, unlabeled training data may be utilized such that the clustering model 212 is able to automatically categorize or cluster messages based on which features (e.g., words, phrases, and/or characters utilized in the messages and/or distances determined based on the words, phrases, length of words, and/or characters utilized in the messages) are most important or useful. In such examples, a cluster may include two or more messages, while utilizing less than ten total messages to determine an accurate pattern or regex. In other embodiments, the clustering model 212 may be based on semi-supervised learning or supervised learning models.

The syslogs, as noted above, may include a plurality of different messages. The system log may be a security log, security event log, device logs (e.g., logs generated based on interactions between a device and a computing device), and/or other types of logs including messages based on an event, interaction, or other occurrence between one or more modules (e.g., software and/or firmware) and/or one or more devices (e.g., computing devices and/or other electronic devices). Non-limiting examples of message generation may occur when a new device with a new IP address connects to a network or other device on the network, during a DHCP request, when a user logs in to a computing device or website, when a system or computing device error occurs, and/or during typical computing device operation.

The event management center 210 may include a pattern and/or regex generator 214. Such a module may utilize a cluster from the clustering model 212 to generate such a pattern. In another embodiment, the functionality of the pattern and/or regex generator 214 may be included in or may be a part of the clustering model 212. Regex, as used herein, may refer to a regular expression that specifies a pattern or search pattern. The regex may be utilized to find a particular message within a syslog.

The event management center 210 may include a module or instructions to generate a user interface (UI) 220, a graphical user interface (GUI), or a web user interface (WUI). The UI 220 may include displaying, to a client device 208A-208N, the generated regexs, parsing script, parsing rules, and/or other relevant information. The data displayed may be editable. Prior to use in future syslog, a user may accept, confirm, or save the generated regexs, parsing script, and/or parsing rules. The UI 220 may further include options to view cluster data, to view removed variable attributes, to remove additional variable attributes, and/or to view the analyzed syslog. In such embodiments, the UI 220 may be configured to allow for manual updates or edits to a cluster. For example, a cluster may include a message that is not related, thus causing generation of an incorrect pattern or regex. A user may remove the unrelated message and then the pattern and/or regex generator 214 or clustering model 212 may generate a new pattern, parsing script or rule, and/or regex. The UI 220 may display one or more generated regexs, parsing script, and/or parsing rules.

The log parsing system 202 may be a physical system (e.g., a server device) and/or an algorithm or module. In an embodiment, the log parsing system 202 may be a downloadable package. In such examples, a user may download and install the log parsing system 202 on the user's client device 208A-208N. The user may then enable or disable the log parsing system 202. When enabled the log parsing system 202 may utilize the client device's physical resources (e.g., processors and/or memory). In another embodiment, the log parsing system 202 may be a web-based or cloud-based service running on remote computing devices. A user may access the log parsing system 202 via login through a WUI or other types of direct connection.

Figure 3:
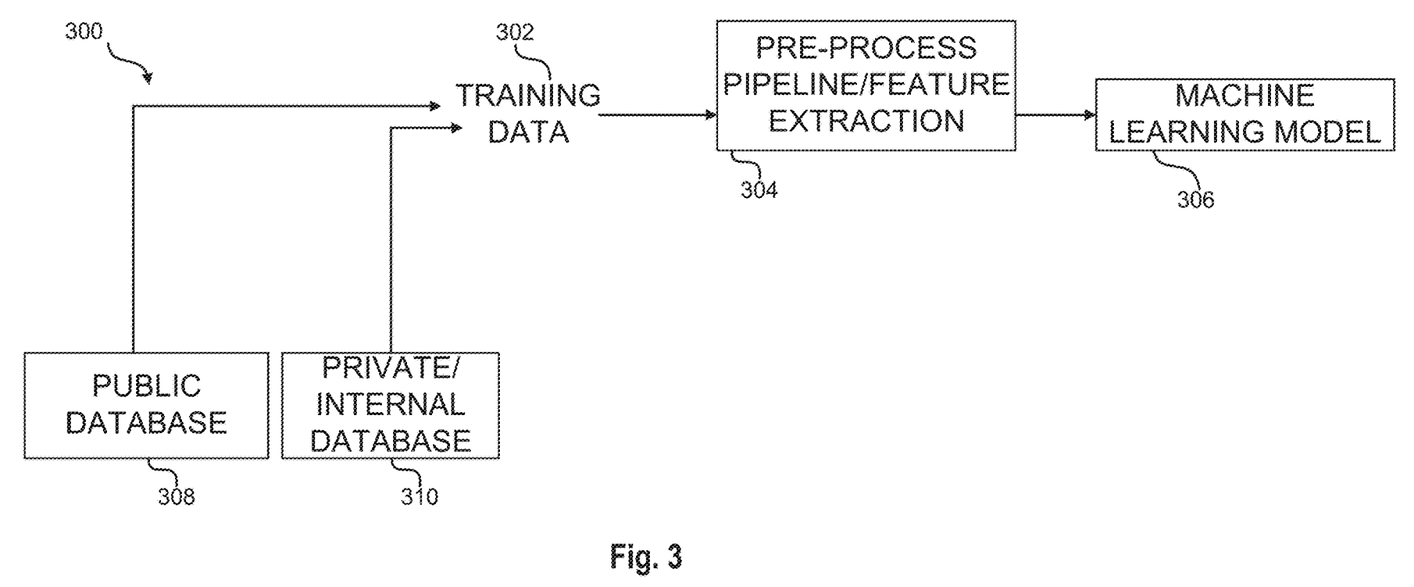
FIG. 3 is a schematic diagram of a system to train a clustering model for determining patterns in various log files, according to one aspect of the present disclosure.

FIG. 3 is a schematic diagram of a system to train a model (e.g., clustering model 212 or machine learning model 306) for determining patterns in various log files, according to one aspect of the present disclosure. Various data sources, such as a private/internal database 310 or repository and/or a public database 308 or repository, as well as newly generated patterns and/or regexs, may be utilized to generate a set of training data 302. Such a set of training data 302 may include large amounts of data points. For example, the set of training data 302 may include a plurality of different log types, labeled or unlabeled, based on the type of learning (e.g., unsupervised, semi-supervised, or supervised). It will be understood that more or less data may be utilized to train the classifiers.

Once a set of training data 302 is obtained or determined, the set of training data 302 may be transmitted to a pre-processing pipeline and/or feature extraction module 304. The pre-processing pipeline and/or feature extraction module 304 may operate or be configured to operate to pre-process the training data 302 or, in some embodiments, syslogs applied or submitted to a model. Pre-processing may include removing variable attributes, identifying the training data 302 or syslogs (e.g., structured, semi-structured, or unstructured), and/or removing irrelevant messages and/or data from the training data or syslogs.

The output of the pre-processing pipeline and/or feature extraction module 304 may then be utilized, with a machine learning model 306, to train a specific log parsing model or classifier (e.g., clustering model 212). In an embodiment, the machine learning model 306 may comprise a single machine learning model or an ensemble machine learning method. The machine learning model may include an unsupervised learning model (e.g., clustering model) and/or a supervised learning model (e.g., neural network model, a Naïve Bayes model, a linear regression model, a logistic regression model, a support vector machine, a decision tree based model, or a k-nearest). An ensemble machine learning method may include two or more of the machine learning models described above or other machine learning models as will be understood by a person skilled in the art.

Figure 4:
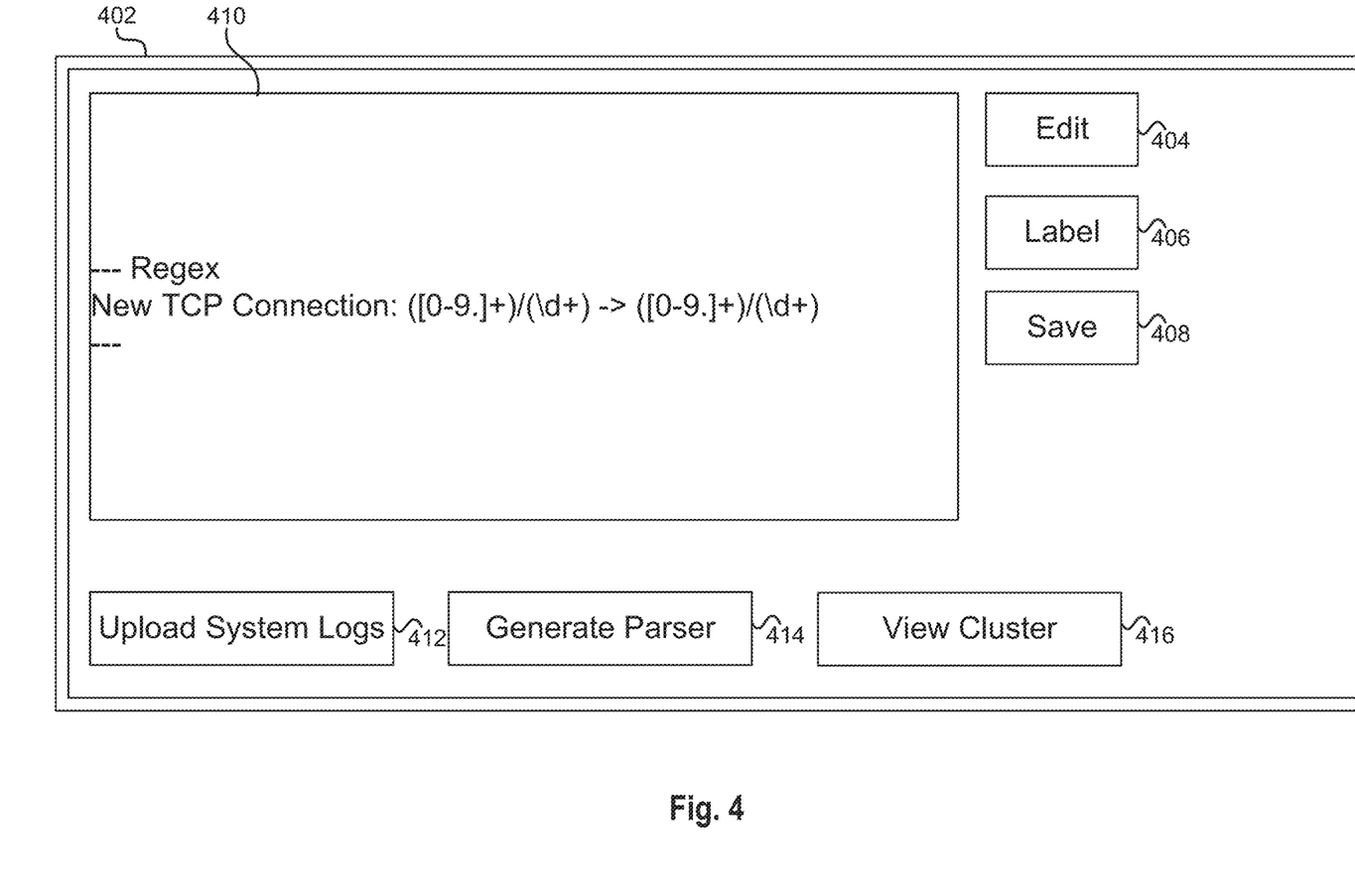
FIG. 4 is a schematic diagram of a graphical user interface for editing and confirming/saving a generated parsing script or rule, according to one aspect of the present disclosure.

FIG. 4 is a schematic diagram of a graphical user interface (GUI) 402 for editing and confirming/saving a generated parsing script or rule, according to one aspect of the present disclosure. The GUI 402 may include an option to upload syslog 412. In addition to receiving syslog via direct upload, the log parsing system may obtain syslog directly from a computing device. Upon selection of upload syslog 412 by a user, a window may pop-up or appear directing a user to select a file at a location or to drag and drop a file. The GUI 402 may generate one or more regex, a parsing script, and/or parsing rules upon selection of a generate parser 414 button or upon an upload or discovery of a system log.

After generation of one or more regex, a parsing script, and/or parsing rules, the results may be displayed in the text window 410. The ability to edit the results may or may not be disabled initially. In an embodiment, the GUI 402 may include an edit button 404. Selecting the edit button 404 may allow a user to edit the results in the text window. In another embodiment, the GUI 402 may include a label button 406 to tag or label any one of the one or more results. Finally, the results, including any labels or edits, may be saved via selection of a save button 408. The GUI 402 may additionally include a button to view clusters 416. Selection of view clusters 416 may display the clusters generated in the text window 410 or in a separate window. In another embodiment, the GUI 402 may include an option to alter or adjust the variable attributes to be removed and/or replaced with a token during analysis. In yet, another embodiment, the GUI 410 may include an option for a user to edit a cluster. For example, a cluster may include one message in a cluster that is different than or unrelated to the remaining messages. The user may analyze the cluster and remove the unrelated message and regenerate the pattern and/or regex.

Figure 5:
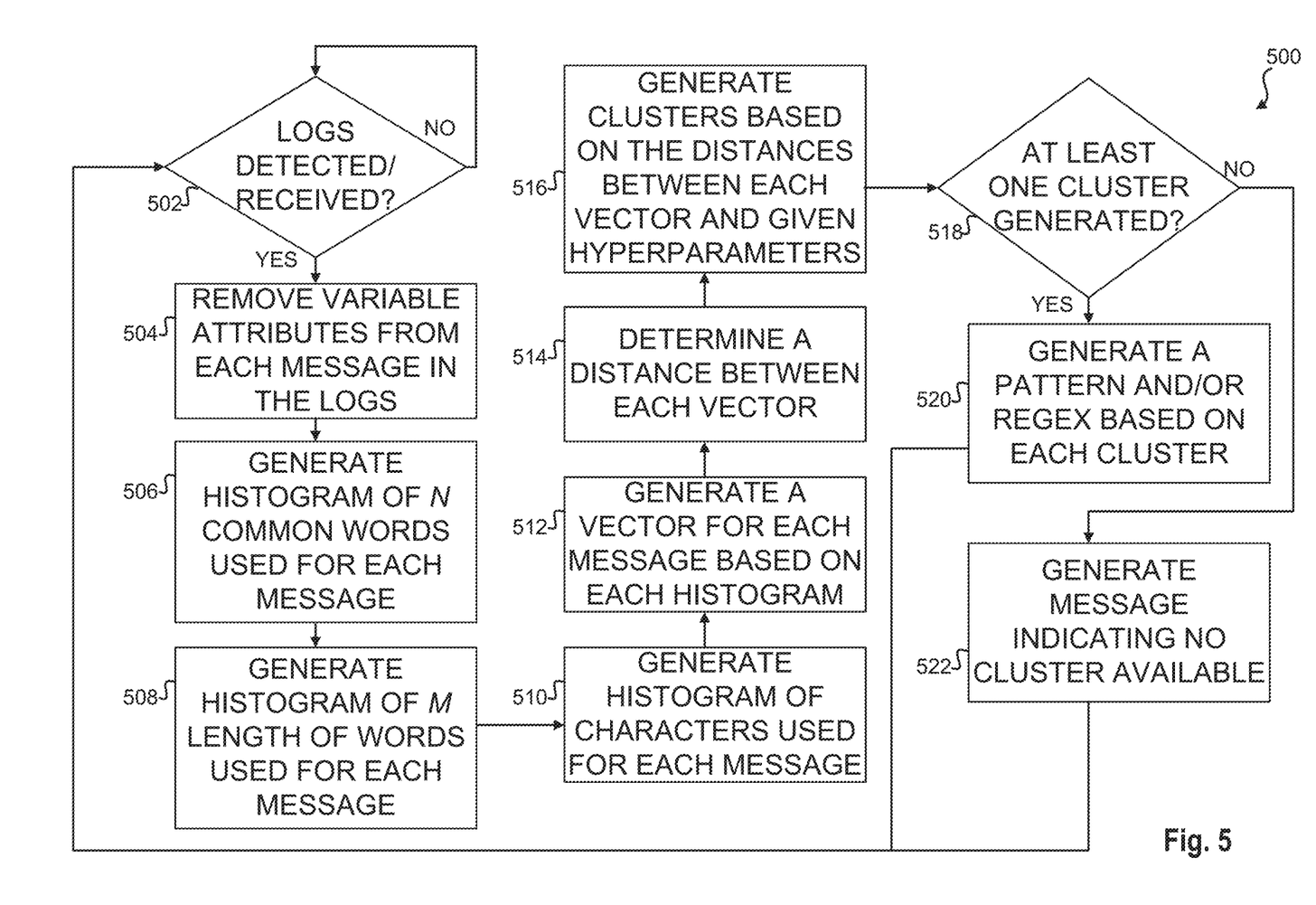
FIG. 5 is a method/process for generating a parsing script or rules for one or more system logs, according to one aspect of the present disclosure.

FIG. 5 is a method/process for generating a parsing script or rules for one or more syslog, according to one aspect of the present disclosure. It also will be understood that any of the Figs. described herein may implement the method 500, in particular FIGS. 1-4.

At block 502, a system device, a processor, or event management center or module may monitor various syslog for new files. The monitoring may be performed continuously or periodically. Further, the specified or selected file locations may be monitored. In another embodiment, the log files may be uploaded to the system device, processor, or event management center or module. As such, the system device, a processor, or event management center or module may include an interface or an API, such as an open API, a REST or RESTful API, JSON or XML API, a SOAP API, or other suitable API as will be understood by a person skilled in the art. For example, a user may submit a system log files via email, via a webform, via an HTTP or HTTPS put or post command, or via other suitable methods.

At block 504, the system device, a processor, or event management center or module may remove variable attributes from messages in each cluster. The variable attributes may include attributes such as dates, IP addresses, user names, a time or timestamps, and/or other variable attributes that are not relevant in generating patterns and/or clusters for log files. In an embodiment, the variable attributes may be removed prior to or after clustering the messages. In yet another embodiment, the system device, a processor, or event management center or module may determine which variable attributes to remove.

At block 506, the system device, a processor, or event management center or module may generate a histogram of N common words used for each message. In other words, each word used in a message may be counted. The amount or N may be a number such that computational time of such a histogram is reduced. In an embodiment, words relevant to a message may be included in the histogram. In another embodiment, functional words may be excluded, such words including, but not limited to, to, the, do, from, and so on.

At block 508, the system device, a processor, or event management center or module may generate a histogram of M length of words used for each message. In other words, the length of each word used in a message may be determined and counted. The amount or M may be a number such that computational time of such a histogram is reduced. In another embodiment, each word length may further be separated based on alpha words, numeric words, and/or alphanumeric words.

At block 510, the system device, a processor, or event management center or module may generate a histogram of characters used for each message. The type of characters used may be limited by the total amount of available characters which may include 127 characters in total.

At block 512, the system device, a processor, or event management center or module may generate a vector based on each histogram and/or other relevant data for each message. The message itself may be saved either in the vector or with a tag or indicator to indicate that the vector corresponds to the message.

At block 514, the system device, a processor, or event management center or module may determine a distance between each vector and another vector. Such a distance may indicate whether two messages are substantially the same. A short or small distance may indicate that two messages are substantially similar, while a long or large distance may indicate that two messages are unrelated or not alike.

At block 516, the system device, a processor, or event management center or module may generate one or more clusters based on the distances between each vector and given hyperparameters or parameters. The hyperparameters or parameters may include a maximum distance between two vectors to form a cluster or an error or epsilon and a maximum cluster size. Once the vectors are clustered, the system device may remove messages from a cluster based on the maximum cluster size or other parameters.

At block 518, the system device, a processor, or event management center or module may determine whether at least one cluster has been generated. In an example, all messages in a log may be unique or may not include substantially similar messages. As such no cluster may be generated. At block 522, the system device may generate a message indicating that no cluster is available. Such a message may be transmitted or displayed to a user or user interface.

At block 520, if at least one cluster is generated, the system device, a processor, or event management center or module may generate a pattern, pattern template, and/or regex based on each cluster. Such a generation of the pattern, pattern template, and/or regex may be performed via a pattern algorithm, module, or software. In another embodiment, a clustering model may perform the pattern, pattern template, and/or regex generation.

Figure 6:
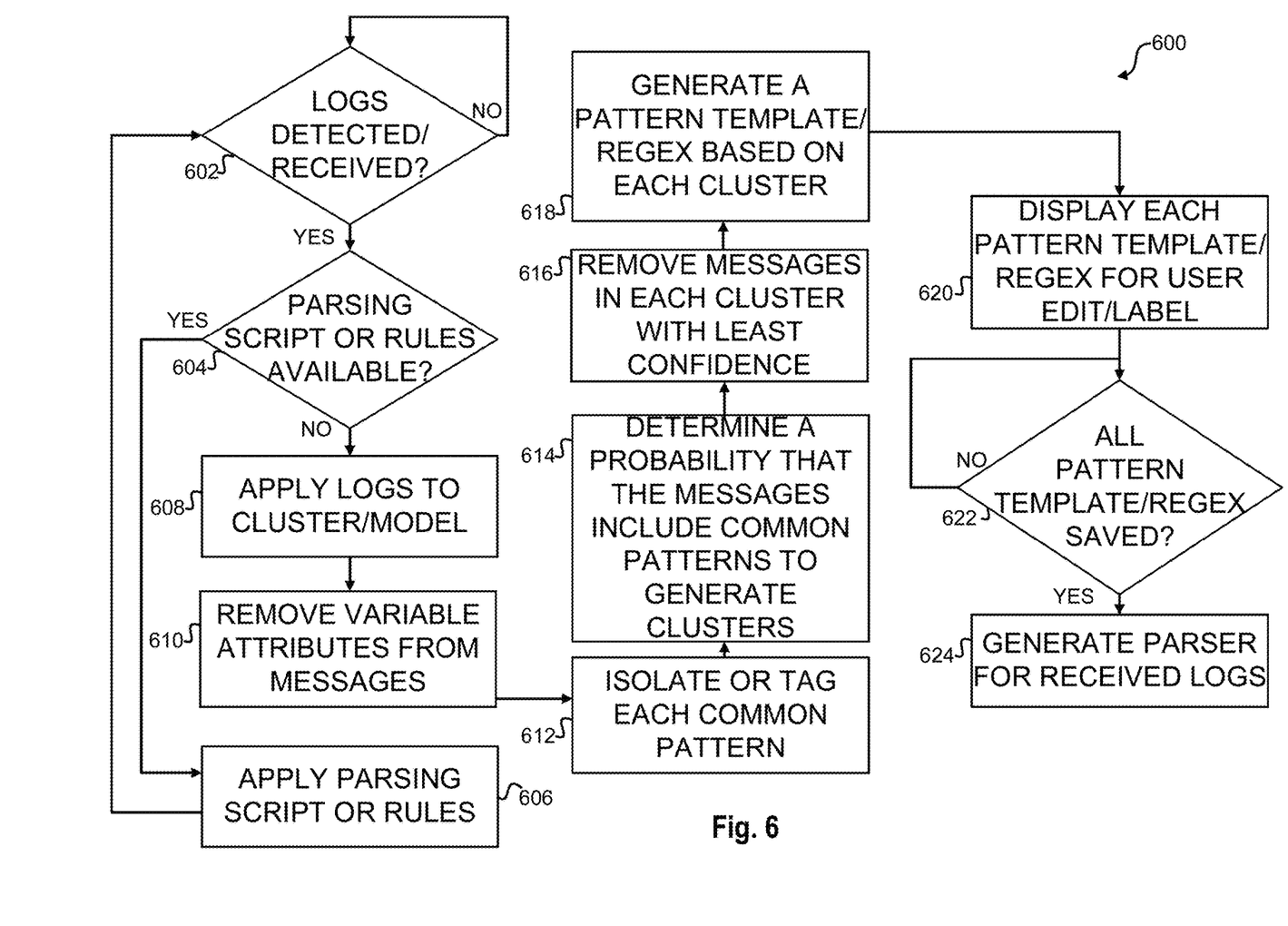
FIG. 6 is another method/process for generating a parsing script or rules for one or more system logs, according to one aspect of the present disclosure.

FIG. 6 is a method/process for generating a parsing script or rules for one or more syslog, according to one aspect of the present disclosure. It also will be understood that any of the Figs. described herein may implement the method 600, in particular FIGS. 1-4.

At block 602, a system device, a processor, or event management center or module may monitor various syslog for new files. The monitoring may be performed continuously or periodically. Further, the specified or selected file locations may be monitored. In another embodiment, the log files may be uploaded to the system device, processor, or event management center or module. As such, the system device, a processor, or event management center or module may include an interface or an API, such as an open API, a REST or RESTful API, JSON or XML API, a SOAP API, or other suitable API as will be understood by a person skilled in the art. For example, a user may submit a system log files via email, via a webform, via an HTTP or HTTPS put or post command, or via other suitable methods.

If log files are detected or received, at block 604, a system device, a processor, or event management center or module may determine whether a parsing script and/or rules are available. The system device, a processor, or event management center or module may determine whether any available parsing script and/or rules apply to the detected or received log files.

At block 606, if an available parsing script and/or rules apply to the detected or received log files, then the system device, a processor, or event management center or module may apply the parsing script and/or rules to the log files to parse the log files. The resulting parsed log files may be saved to a user's computing device or displayed for a user to review.

At block 608, the system device, a processor, or event management center or module may apply or submit the logs to a cluster algorithm or model trained to generate or create a pattern based on similar messages in the log file. The cluster algorithm or model may generate one or more clusters including one or more messages from the log files. Each message in a particular cluster may be separated by a specified or pre-determined distance. The distance may be determined based on a number of differences between characters and words or phrases in two different messages.

At block 610, the system device, a processor, or event management center or module may remove variable attributes from messages in each cluster. The variable attributes may include attributes such as dates, IP addresses, user names, a time or timestamps, and/or other variable attributes that are not relevant in generating patterns and/or clusters for log files. The distance between each message in a cluster may be determined again based on the removal of the variable attributes. In another embodiment, the variable attributes may be removed prior to or after clustering the messages. In yet another embodiment, the system device, a processor, or event management center or module may determine which variable attributes to remove.

At block 612, the system device, the processor, or event management center or module may isolate or tag each common pattern. In other embodiments, a user may tag a common pattern when viewing the pattern or resulting regex, parsing script and/or parsing rules in a user interface generated by the system device, the processor, or event management center or module may.

At block 614, the system device, the processor, or event management center or module may utilize the clustering model to determine that the syslogs of include common features, attributes or patterns of a substantially similar type, and if two or more such syslogs are identified, the clustering model can generate one or more clusters of same or substantially the same type syslogs. In other words, the system device, the processor, or event management center or module may determine whether a pattern exists between messages of one of the one or more clusters.

At block 616, the system device, the processor, or event management center or module may remove messages in each cluster with the least confidence. Confidence of a relationship between two messages in a cluster may be determined based on the distance between each message in a cluster. A cluster may include many messages (e.g., ten or more), however, to provide higher accuracy, less than or equal to ten messages may be utilized to generate a regex, parsing script, and/or parsing rules. Thus messages with higher distances in the cluster may be removed, such that less than or equal to ten messages remain in a cluster.

At block 618, the system device, the processor, or event management center or module may generate the regex, pattern template, parsing script, and/or parsing rules for each cluster based on each message in a cluster.

At block 620, the system device, the processor, or event management center or module may display each of the one or more generated regex, pattern template, parsing script, and/or parsing rules in a user interface. The user interface may be generated by the system device, the processor, or event management center or module. The user interface may allow for a user to edit the resulting regex, pattern template, parsing script, and/or parsing rules in the user interface. Further, the user interface may enable the user to view each cluster, each removed variable attribute, and/or the syslog, among other relevant data.

At block 622, the system device, the processor, or event management center or module may determine whether each regex, pattern template, parsing script, and/or parsing rule are saved. The system device, the processor, or event management center or module may wait until each is either saved or confirmed.

At block 624, the system device, the processor, or event management center or module may generate the parser for the received syslog. The parser may be a set of instructions or an algorithm to parse and/or sort messages in a log file. Such actions may enable message recognition, enable ease of manual analysis, and/or enable highlighting or call out urgent messages. Thus, users analyzing various different types of system or security logs may easily and timely analyze a set of logs.

Figure 7:
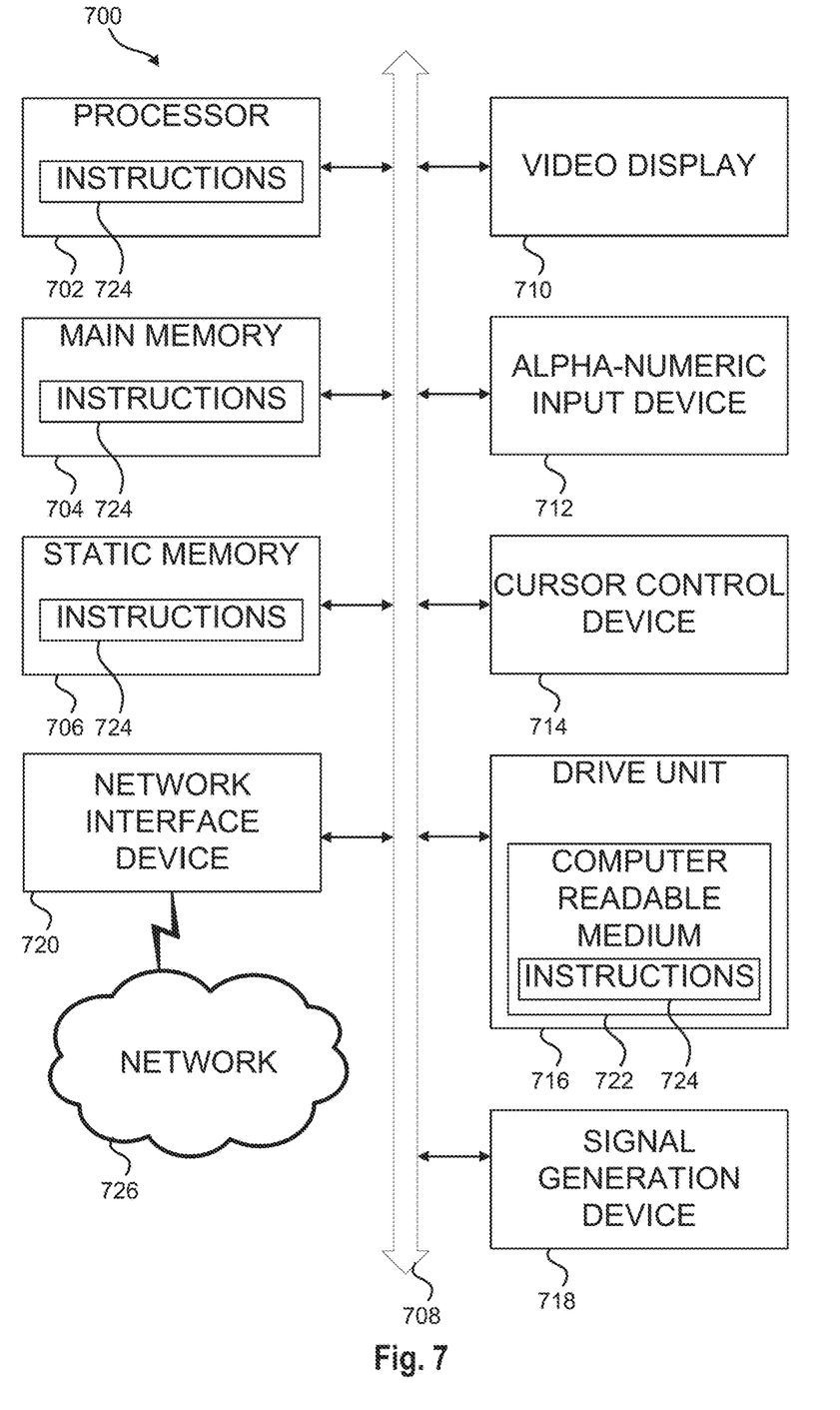
FIG. 7 is a schematic diagram of an information handling system capable of administering each of the specific embodiments, according to one aspect of the present disclosure.

FIG. 7 shows an example of an information handling system 700 capable of administering each of the specific embodiments of the present disclosure and variations thereof. The information handling system 700 can represent the systems of FIGS. 1 through 4. The information handling system 700 may include a computer system or processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. The information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 802), or other network. The network interface 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A system for generation of parsing scripts or rules for system logs, comprising:
   an event management center including at least one processor and memory configured to:
   receive a plurality of system log messages in real-time from a plurality of monitored devices, the plurality of system log messages including a plurality of different types of unstructured or semi-structured system log messages;
   determine whether one or more parsing scripts or rules are available to parse or normalize at least some of the plurality of system log messages; and if one or more parsing scripts or rules are available to parse or normalize at least some of the plurality of system log messages, apply the one or more parsing scripts or rules thereto; and if one or more of the plurality of system log messages are in an unrecognized format or a parsing script or rule is not available to parse or normalize the system log messages:

submit the one or more of the plurality of system log messages to at least one clustering model stored in a memory of or accessible by the at least one processor to form clusters of system log messages of the one or more of the plurality system log messages that are of substantially a same type,     wherein the system log messages of a cluster are separated by a distance based on differences between characters in each of the system log messages of the cluster,     search for patterns within the system log messages of the cluster,     remove one or more variable attributes from each of the plurality of system log messages,     determine, via the at least one clustering model, a probability that the patterns between each of the system log messages of the cluster indicates a high confidence or low confidence of relationship between the system log messages,     remove one or more of the plurality of the system log messages in each of the clusters based on an indication of low confidence,     generate a pattern template for each of the plurality of system log messages within each of the clusters, and     generate a new parsing script based on the pattern template.

2. The system of claim 1, wherein the event management center comprises a data center of a managed security service provider.

3. The system of claim 1, wherein the event management center comprises a network server.

4. The system of claim 1, wherein the at least one clustering model is further configured to identify patterns within at least two of the plurality of system log messages of one of the clusters and develop a vocabulary of most commonly used attributes thereof.

5. The system of claim 4, wherein the at least one clustering model is further configured to determine a distance between each of the plurality of system log messages within each cluster based upon a number of non-varying attributes present in each of the plurality of system log messages and clustering the each of the plurality of system log messages based upon a selected distance.

6. The system of claim 1, wherein the event management center is further configured to apply one or more training data sets to the at least one clustering model to form the clusters, the one or more training data sets including historically identified features or attributes indicative of identifiable ones of the plurality of system log messages received by the event management center.

7. The system of claim 1, wherein the at least one clustering model is further configured to group the system log messages into the clusters based upon two or more selected parameters including a selected number of messages, a size of a vocabulary of commonly used attributes, a selected attribute length, a maximum distance between system log messages, and a minimum number of system log messages per cluster.

8. A method of generating parsing scripts or rules for security log data, comprising:

receiving security log data in real-time comprising a plurality of different types of unstructured or semi-structured system log messages from a plurality of monitored devices;

applying a probabilistic model to identify system log messages having a series of common attributes indicating the system log messages are of a same or substantially same type;

clustering system log messages of the same or substantially same type to form clusters;

determining a confidence level of matching for each of the system log messages of each of the clusters with other system log messages in a corresponding cluster;

removing system log messages with a level of confidence below a selected threshold from the corresponding cluster; and     generating one or more regex pattern scripts configured to match an identified type of system log messages based on the clustered system log messages and corresponding confidence levels of each of the clustered system log messages.

9. The method of claim 8, further comprising generating training data sets for training the probabilistic model.

10. The method of claim 9, further comprising updating the training data sets with security log data processed by the probabilistic model.

11. The method of claim 8, further comprising determining whether one or more parsing scripts or rules are available for parsing and/or normalization of the system log messages, and if one or more parsing scripts or rules are available to parse or normalize unstructured data in one or more of the system log messages, applying at least one selected parsing script or rule to the unstructured data for parsing or normalization of the unstructured data into a normalized log.

12. The method of claim 8, further comprising applying historical patterns to the system log messages.

* * * * *